United States Patent
Ge et al.

(10) Patent No.: US 9,900,926 B2
(45) Date of Patent: Feb. 20, 2018

(54) MULTI-DEVICE INTELLIGENT INTERCONNECTION METHOD AND SYSTEM BASED ON BLUETOOTH

(71) Applicant: HUIZHOU TCL MOBILE COMMUNICATIONS CO., LTD, HuiZhou, Guangdong (CN)

(72) Inventors: Liangbo Ge, HuiZhou (CN); Longjie Yu, HuiZhou (CN)

(73) Assignee: HUIZHOU TCL MOBILE COMMUNICATION CO., LTD., Guangdong (CN)

( * ) Notice: Subject to any disclaimer, the term of this patent is extended or adjusted under 35 U.S.C. 154(b) by 16 days.

(21) Appl. No.: 15/114,079

(22) PCT Filed: Oct. 16, 2015

(86) PCT No.: PCT/CN2015/092109
§ 371 (c)(1),
(2) Date: Jul. 26, 2016

(87) PCT Pub. No.: WO2016/155286
PCT Pub. Date: Oct. 6, 2016

(65) Prior Publication Data
US 2017/0048911 A1    Feb. 16, 2017

(30) Foreign Application Priority Data
Apr. 1, 2015 (CN) .......................... 2015 1 0151016

(51) Int. Cl.
H04W 4/00 (2009.01)
H04W 76/02 (2009.01)
H04W 84/18 (2009.01)

(52) U.S. Cl.
CPC .......... *H04W 76/025* (2013.01); *H04W 4/00* (2013.01); *H04W 4/008* (2013.01); *H04W 76/028* (2013.01); *H04W 84/18* (2013.01)

(58) Field of Classification Search
CPC . H04W 76/025; H04W 4/008; H04W 76/028; H04W 84/18; H04W 4/00
See application file for complete search history.

(56) References Cited

U.S. PATENT DOCUMENTS 9,179,486 B2    11/2015  Kim et al.
2002/0012329 A1*  1/2002  Atkinson ............. G06F 9/4411
                                                      370/330

(Continued)

FOREIGN PATENT DOCUMENTS

CN    102164399    8/2011
CN    102170679    8/2011

(Continued)

*Primary Examiner* — Lewis West
(74) *Attorney, Agent, or Firm* — Mark M. Friedman (57) ABSTRACT

A multi-device intelligent interconnection method and system are disclosed. The method includes: establishing a connection with a peripheral device by a central device; transmitting a first self-defined string message to the peripheral device to inform the peripheral device to report a type of a service; receiving the reported type of the service from the peripheral device by the central device, and disconnecting the connection with the peripheral device; and reestablishing the connection or connections with one or more of the peripheral devices through actively initiating one of the services or receiving a request or requests for initiating one or more of the services.

20 Claims, 6 Drawing Sheets

(56) References Cited

U.S. PATENT DOCUMENTS

2011/0028093 A1* 2/2011 Patel .................... H04B 17/27
455/41.2
2013/0322260 A1* 12/2013 Yao .................... H04W 72/082
370/241

FOREIGN PATENT DOCUMENTS

| CN | 103687058 | 3/2014 |
| CN | 104780499 | 7/2015 |

* cited by examiner

MULTI-DEVICE INTELLIGENT INTERCONNECTION METHOD AND SYSTEM BASED ON BLUETOOTH

CROSS REFERENCE TO RELATED APPLICATION

This application claims the priority of International Application No. PCT/CN2015/092109, filed Oct. 16, 2015, which claims the priority of Chinese Patent Application No. 201510151016.7, filed Apr. 1, 2015 in the SIPO (State Intellectual Property Office of the P.R.C) and entitled "Multi-device Intelligent Interconnection Method and System Based on Bluetooth". The entire disclosures of each of the above applications are incorporated herein by reference.

BACKGROUND OF THE INVENTION

1. Field of the Invention

The present invention generally relates to a field of Bluetooth technology, and more particularly to a multi-device intelligent interconnection method based on Bluetooth.

2. Description of Prior Art

With the popularity of electronic devices, more and more intelligent terminals with a Bluetooth function, e.g. smart mobile phones, tablets, laptop computers, Bluetooth stereo systems, Bluetooth earphones, wireless cameras, smart televisions, smart lamps, smart refrigerators, smart water heaters, smart printers and so on, are widely used by people. Users often hope that these intelligent terminals can be interconnected intelligently. Since the smart mobile phones are powerful and often used, it is hoped that the smart mobile phones can become control centers and service providers. For example, the users sometimes hope to control the smart lamps or smart water heaters through the smart mobile phones on hand; the users sometimes hope to control the smart mobile phones in the distance to make or answer a call through the tablets on hand; the users sometimes hope to use Bluetooth speakers or tablets to play songs stored in the smart mobile phones; the users sometimes hope to use the laptop computers to display and process position information of Global Navigation Satellite Systems (GNSS) in the smart mobile phones. Currently, the smart mobile phones can generally implement interconnections with other Bluetooth device or devices to achieve some service functions. However, after these service functions are initiated, these service functions can be normally used only when the devices are set up and connected with each other by the users. Furthermore, some of the service functions are not conveniently used for the users. For example, a function of using a tablet to make or answer a call through a smart mobile phone is not supported.

Consequently, the prior art needs to be further improved and developed.

DISCLOSURE OF THE INVENTION

Based on the above-mentioned deficiencies in the prior art, an object of the present invention is to provide a multi-device intelligent interconnection method and system based on Bluetooth aiming to solving the problem that when a service is initiated between different devices, the steps are complicated because the devices are required to be set up and connected with each other in the prior art.

The present invention utilizes the following technical schemes to solve the technical problem.

A multi-device intelligent interconnection method based on Bluetooth comprises steps of:

Inquiring a peripheral device within a range of a predetermined distance and transmitting a connection request to the peripheral device by a central device;

Transmitting a first self-defined string message by the central device to the peripheral device to inform the peripheral device to report a type of a service, after a connection is established, the first self-defined string message including a command length field, a destination channel identification field, and a payload information field;

Transmitting a second self-defined string message to the central device and reporting the type of the service by the peripheral device per se;

Receiving the reported type of the service from the peripheral device by the central device, and disconnecting the connection with the peripheral device by the central device;

Repeating the above-mentioned steps to establish one or more connections with other peripheral devices in turn and completing a network construction, generating and storing a service type list of the peripheral devices according to Bluetooth addresses and the types of the services corresponding to all the peripheral devices by the central device; and Reestablishing the connection or connections with one or more of the peripheral devices to complete an interconnection or interconnections between the central device and the one or more of the peripheral devices through actively initiating one of the services or receives a request or requests for initiating one or more of the services from the one or more of the peripheral devices;

Wherein the step of reestablishing the connection or connections with the one or more of the peripheral devices to complete the interconnection or interconnections between the central device and the one or more of the peripheral devices, after the central device receives the request or requests for initiating the one or more of the services from the one or more of the peripheral devices specifically comprises: sending the request or requests for initiating the one or more of the services, and establishing the connection or connections with the central device by the one or more of the peripheral devices; transmitting one or more self-defined service initiation messages to the central device to inform the central device of the type of the service or the types of the services to be initiated, by the one or more of the peripheral devices; and receiving a user's command, and accepting or refusing the service or the services, after the central device receives the self-defined service initiation message or messages.

In the multi-device intelligent interconnection method based on Bluetooth, the second self-defined string message includes a command length field, a destination channel identification field, and a payload information field.

In the multi-device intelligent interconnection method based on Bluetooth, the step of reestablishing the connection or connections with the one or more of the peripheral devices to complete the interconnection or interconnections between the central device and the one or more of the peripheral devices through actively initiating the one of the services by the central device specifically comprises:

Actively initiating the service to inquire adjacent one or more of the peripheral devices by the central device;

Selecting one or more of the peripheral devices which support the type of the service according to the stored service type list of the peripheral devices, and establishing the connection or connections in turn to construct a piconet;

Transmitting self-defined broadcast information to the one or more of the peripheral devices in the piconet and broadcasting the type of the service to be initiated by the central device;

Receiving the user's command and transmitting one or more self-defined response messages to the central device, after the one or more of the peripheral devices in the piconet receive the type of the service broadcasted from the central device; and Giving a connection or disconnection feedback according to content of the response message or messages from the one or more of the peripheral devices by the central device.

In the multi-device intelligent interconnection method based on Bluetooth, the central device is a mobile terminal with a Bluetooth function.

A multi-device intelligent interconnection method based on Bluetooth comprises steps of:

Inquiring a peripheral device within a range of a predetermined distance and transmitting a connection request to the peripheral device by a central device;

Transmitting a first self-defined string message to the peripheral device by the central device to inform the peripheral device to report a type of a service, after a connection is established;

Transmitting a second self-defined string message to the central device and reporting the type of the service by the peripheral device per se;

Receiving the reported type of the service from the peripheral device by the central device, and disconnecting the connection with the peripheral device by the central device;

Repeating the above-mentioned steps to establish one or more connections with other peripheral devices in turn and completing a network construction, generating and storing a service type list of the peripheral devices according to Bluetooth addresses and the types of the services corresponding to all the peripheral devices by the central device; and Reestablishing the connection or connections with one or more of the peripheral devices to complete an interconnection or interconnections between the central device and the one or more of the peripheral devices through actively initiating one of the services or receiving a request or requests for initiating one or more of the services from the one or more of the peripheral devices, by the central device.

In the multi-device intelligent interconnection method based on Bluetooth, the first self-defined string message and the second self-defined string message respectively includes a command length field, a destination channel identification field, and a payload information field.

In the multi-device intelligent interconnection method based on Bluetooth, the step of reestablishing the connection or connections with the one or more of the peripheral devices to complete the interconnection or interconnections between the central device and the one or more of the peripheral devices through actively initiating the one of the services by the central device specifically comprises:

Actively initiating the service to inquire adjacent one or more of the peripheral devices by the central device;

Selecting one or more of the peripheral devices which support the type of the service according to the stored service type list of the peripheral devices, and establishing the connection or connections in turn to construct a piconet;

Transmitting self-defined broadcast information to the one or more of the peripheral devices in the piconet and broadcasting the type of the service to be initiated by the central device;

Receiving the user's command and transmitting one or more self-defined response message to the central device, after the one or more of the peripheral devices in the piconet receives the type of the service broadcasted from the central device; and Giving a connection or disconnection feedback according to content of the response message or messages from the one or more of the peripheral devices by the central device.

In the multi-device intelligent interconnection method based on Bluetooth, the step of reestablishing the connection or connections with the one or more of the peripheral devices to complete the interconnection or interconnections between the central device and the one or more of the peripheral devices, after the central device receives the request or requests for initiating the one or more of the services from the one or more of the peripheral devices specifically comprises:

Sending the request or requests for initiating the one or more of the services, and establishing the connection or connections with the central device by the one or more of the peripheral devices;

Transmitting one or more self-defined service initiation messages to the central device to inform the central device of the type of the service or the types of the services to be initiated, by the one or more of the peripheral devices; and Receiving a user's command, and accepting or refusing the service or the services, after the central device receives the self-defined service initiation message or messages.

In any one of the multi-device intelligent interconnection methods based on Bluetooth, the central device is a mobile terminal with a Bluetooth function.

A multi-device intelligent interconnection system based on Bluetooth comprises:

An inquiring module utilized to inquire a peripheral device within a range of a predetermined distance and transmit a connection request to the peripheral device by a central device;

A transmitting and informing module utilized to transmit a first self-defined string message to the peripheral device by the central device to inform the peripheral device to report a type of a service, after a connection is established;

A reporting module utilized to transmit a second self-defined string message to the central device and report the type of the service by the peripheral device per se;

A disconnection controlling module utilized to receive the reported service type from the peripheral device by the central device, and disconnect the connection with the peripheral device by the central device;

A networking module utilized to establish one or more connections with other peripheral device or devices in turn, generate and store a service type list of the peripheral devices according to Bluetooth addresses and the types of the services corresponding to all the peripheral devices by the central device; and An interconnecting module utilized to reestablish the connection or connections with one or more of the peripheral devices to complete an interconnection or interconnections between the central device and the one or more of the peripheral devices through actively initiating one of the services or receives a request or requests for initiating one or more of the services from the one or more of the peripheral devices, by the central device.

In the multi-device intelligent interconnection system based on Bluetooth, the first self-defined string message and the second self-defined string message respectively include a command length field, a destination channel identification field, and a payload information field.

In multi-device intelligent interconnection system based on Bluetooth, the interconnecting module comprises:

A transmitting and inquiring unit utilized to actively initiate the service to inquire adjacent one or more of the peripheral devices by the central device;

A connecting unit utilized to select one or more of the peripheral devices which support the type of the service according to the stored service type list of the peripheral devices, and establish the connection or connections in turn to construct a piconet;

A broadcasting unit utilized to transmit self-defined broadcast information to the one or more of the peripheral devices in the piconet and broadcast the type of the service to be initiated by the central device;

A responding unit utilized to receive a user's command and transmit one or more self-defined response messages to the central device, after the one or more of the peripheral devices in the piconet receive the type of the service broadcasted from the central device; and A feedback module utilized to give a connection or disconnection feedback according to content of the response message or messages from the one or more peripheral devices by the central device.

In the multi-device intelligent interconnection system based on Bluetooth, the interconnecting module comprises:

A second connecting unit utilized to send the request or requests for initiating the one or more of the services and to establish the connection or connections with the central device by the one or more of the peripheral devices;

An informing unit utilized to transmit one or more self-defined service initiation messages to the central device to inform the central device of the type of the service or the types of the services to be initiated, by the one or more of the peripheral devices; and A receiving unit utilized to receive a user's command, and accept or refuse the service or the services, after the central device receives the self-defined service initiation message or messages.

In any one of the multi-device intelligent interconnection systems based on Bluetooth, the central device is a mobile terminal with a Bluetooth function.

The present invention provides the multi-device intelligent interconnection method and system based on Bluetooth. The method comprises: inquiring a peripheral device within a range of a predetermined distance and transmitting a connection request to the peripheral device by a central device; transmitting a first self-defined string message to the peripheral device by the central device to inform the peripheral device to report a type of a service, after a connection is established; transmitting a second self-defined string message to the central device and reporting the type of the service by the peripheral device per se; receiving the reported type of the service from the peripheral device by the central device, and disconnecting the connection with the peripheral device by the central device; repeating the above-mentioned steps, establishing one or more connections with other peripheral device or devices in turn, generating and storing a service type list of the peripheral devices according to Bluetooth addresses and the types of the services corresponding to all the peripheral devices to construct a network, by the central device; and reestablishing the connection with one of the peripheral devices to complete an interconnection between the central device and the one of the peripheral devices through actively initiating a service or receives a request for initiating a service or services from the one of the peripheral devices by the central device. Based on the traditional Bluetooth, the present invention implements the intelligent interconnection between a smart mobile phone and an adjacent peripheral device with a Bluetooth function. The user can rapidly initiate the connection of the service based on Bluetooth between or among the devices, and thus the present invention provides the convenience for the user.

BRIEF DESCRIPTION OF THE DRAWINGS

To clarify embodiments of the present disclosure or technical schemes in the prior arts, appended drawings required in the descriptions of the embodiments and the prior arts are briefly described as follows. It should be apparent that the following drawings merely illustrate some embodiments of the present disclosure. For those skilled in the art, other drawings may be acquired according to the drawings without devoting effort.

BEST EMBODIMENT FOR CARRYING OUT THE INVENTION

To make the objectives, technical schemes, and technical effects of the present invention more clear and definite, the present invention will be described in details below by using embodiments in conjunction with the appending drawings. It should be understood that the specific embodiments described herein are merely for explaining the present invention and are not intended to limit the present invention.

Firstly, the traditional Bluetooth protocol is described in detail as follows.

The advantages of the traditional Bluetooth protocol are that a transmission data amount is large and a transmission data rate is fast, and thus the traditional Bluetooth protocol is suitable for various practical applications. The development of the traditional Bluetooth protocol mainly focuses on the Logical Link Control and Adaptation Protocol (L2CAP), the Generic Access Profile (GAP), and the Application Profile which are respectively described as follows.

According to the traditional Bluetooth protocol published by the Bluetooth Special Interest Group, a command format and a data format are defined by the Logical Link Control and Adaptation Protocol (L2CAP).

Two Bluetooth devices interact with each other via a series of commands in a communication process. A common signaling format of a command channel is shown in Table 1.

TABLE 1

| | | Commands | | | |
|---|---|---|---|---|---|
| Length | Channel ID | Code | Identifier | Length | Data |
| m + 4 | 0001 | | | m | |
| 2 Bytes | 2 Bytes | 1 Byte | 1 Byte | 2 Bytes | m Bytes |

Length represents a byte length of a command. Channel ID is fixedly set as 0x0001. Code in the Commands represents a type of the command, such as a connection request, a connection response, and so on as shown in Table 2. Identifier in the Commands is utilized for matching with the request and the response. Length in the Commands represents a byte length of data in the command. Data in the Commands represents information which the command can carry.

TABLE 2

| Code | Description |
|---|---|
| 0x00 | RESERVED |
| 0x01 | Command reject |
| 0x02 | Connection request |
| 0x03 | Connection response |
| 0x04 | Configure request |
| 0x05 | Configure response |
| 0x06 | Disconnection request |
| 0x07 | Disconnection response |
| 0x08 | Echo request |
| 0x09 | Echo response |
| 0x0A | Information request |
| 0x0B | Information response |

Formats of Commands of the connection request are shown in Table 3. PSM represents multiplex of protocol/service and has a length of at least two bytes. Source CID (an ID of a source channel) represents a channel ID of a Bluetooth device which transmits the connection request.

TABLE 3

| | | | Data | |
|---|---|---|---|---|
| Code | Identifier | Length | PSM | Source CID |
| 02 | | m + 2 | | |
| 1 Byte | 1 Byte | 2 Bytes | m (≥2) Bytes | 2 Bytes |

Formats of Commands of the connection response are shown in Table 4.

TABLE 4

| | | | Data | | | |
|---|---|---|---|---|---|---|
| Code | Identifier | Length | Destination CID | Source CID | Result | Status |
| 03 | | 0008 | | | | |
| 1 Byte | 1 Byte | 2 Bytes | 2 Bytes | 2 Bytes | 2 Bytes | 2 Bytes |

Destination CID (an ID of a destination channel) represents a channel ID of a Bluetooth device which transmits the connection response. Source CID (an ID of a source channel) represents a channel ID of a Bluetooth device which receives the connection response. Source CID directly copies Source CID in the command of the connection request. Result represents a signaling result of the connection request. For example, the result is connection successful, connection pending, and connection refused as shown in Table 5.

TABLE 5

| Value | Description |
|---|---|
| 0x0000 | Connection successful |
| 0x0001 | Connection pending |
| 0x0002 | Connection refused - PSM not supported |
| 0x0003 | Connection refused - security block |
| 0x0004 | Connection refused - no resources available |
| Other | Reserved |

When the result is connection pending, Status is utilized for describing the reason why the result is connection pending, as shown in Table 6.

TABLE 6

| Value | Desciption |
|---|---|
| 0x0000 | No further information available |
| 0x0001 | Authentication pending |
| 0x0002 | Anthorization pending |
| Other | Reserved |

When a peer-to-peer connection between two Bluetooth devices is established, the two Bluetooth devices can transmit string data with each other. A format of a data package is shown in Table 7. Length represents a byte length of an information payload. Channel ID represents an ID of the destination channel and is dynamically allocated by a system. Information payload represents content of the data package, and a length of the data package can be set as 0 to 65535 bytes.

TABLE 7

| Length | Channel ID | Information payload |
|---|---|---|
| m | | |
| 2 Bytes | 2 Bytes | m Bytes |

When three or more Bluetooth devices are successfully connected to construct a piconet, a master device can transmit string data to all slave devices in the piconet. A format of a data package transmitted by the master device is shown in Table 8. Length represents a total byte length of PSM and an information payload. Channel ID is fixedly set as 0x0002. PSM represents multiplex of protocol/service. PSM is divided into two parts and has a length of at least two bytes. The first part, which is allocated by the Bluetooth Special Interest Group, is utilized as protocol. The second part, which is allocated by the system, is utilized as a service. Information payload represents content of the data package, and a length of an information payload can be set as 0 to 65535 bytes. The format of the data package transmitted from one of the slave devices to the master device in the piconet is shown in Table 7.

TABLE 8

| Length | Channel ID | PSM | Information payload |
|---|---|---|---|
| m + n | 0002 | | |
| 2 Bytes | 2 Bytes | m (≥2) Bytes | n Bytes |

The Generic Access Profile (GAP) defines statuses and processes which can be inquired, discoverable, connectable, and connected.

In a time-division multiplexing method, one Bluetooth device can inquire one or more nearby Bluetooth devices, and meanwhile the Bluetooth device can be discovered by the one or more nearby Bluetooth devices. That is, one traditional Bluetooth device can serve as an inquiring device and a discoverable device. The inquiring device can acquire an address of the discoverable devices by inquiring the discoverable device.

The inquiring device and the discoverable device can still remain the inquiring function and the discoverable function even if the inquiring device and the discoverable device are connected to other Bluetooth devices.

In the time-division multiplexing method, one Bluetooth device can connect with one nearby Bluetooth device, and meanwhile the Bluetooth device can be connected by one nearby Bluetooth device. That is, the Bluetooth device can serve as a connecting device and a connectable device simultaneously. One connecting device transmits a connection request to a connectable device, and the one connectable device transmits a connection response to the one connecting device. After the connection succeeds, the Bluetooth device which initiates the connection serves as a master device in the piconet, and the connected Bluetooth device serves as a slave device in the piconet.

The connecting device and the connectable device can still remain the connecting function and the connectable function even if the connecting device and the connectable device are connected to other Bluetooth devices.

When two Bluetooth devices are successfully connected with each other, the Bluetooth devices can transmit string messages to each other. When the connection remains between the Bluetooth devices, they still have the inquiring, discoverable, connecting, and connectable functions.

Figure 1:
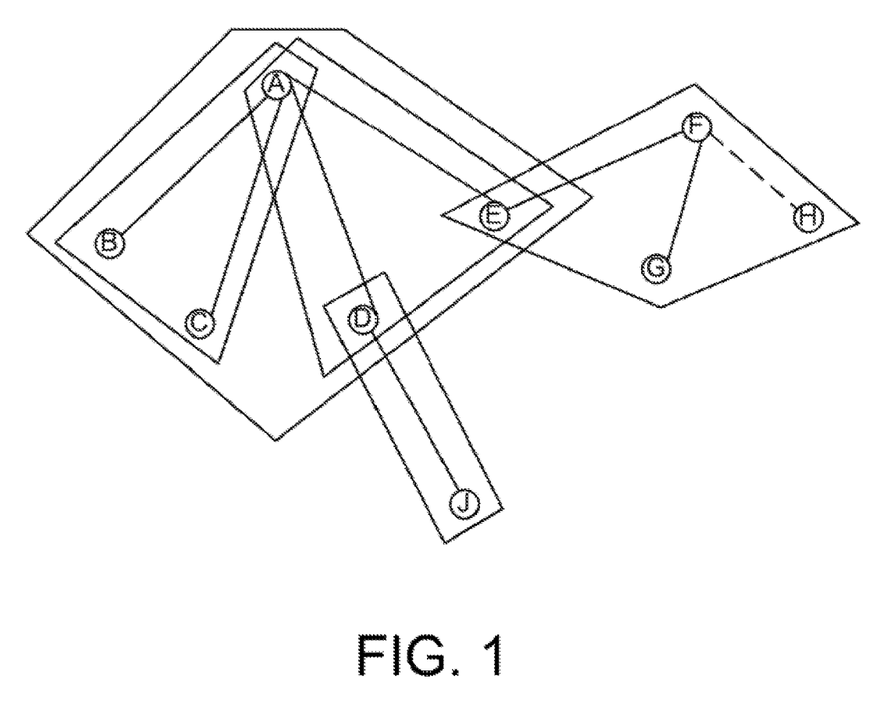
FIG. 1 is a network topology structure in accordance with a preferred embodiment of a multi-device intelligent interconnection method based on Bluetooth provided by the present invention.

Plural Bluetooth devices can compose a network. A network topology structure is shown in FIG. 1. There are three piconets in FIG. 1. In one piconet, A serves as a master device, and B, C, D, and E serve as slave devices. In another piconet, F serves as a master device, and E, G, and H serve as slave devices. In the other piconet, D serves as a master device, and J serves as a slave device. A piconet is composed of one master device and one to seven slave devices. In a piconet, the master device can transmit a string message to all slave devices simultaneously. All slave devices can respectively a string message to the master device.

At least one Bluetooth device exists in both the piconet A and piconet F and in both the piconet A and piconet D. Accordingly, the piconet A, the piconet F, and the piconet D compose scatternets. For example, in a scatternet composed of the piconet A and the piconet F, E can transmit a string message to A and F simultaneously. In a scatternet composed of the piconet A and the piconet D, D can transmit a string message to A and J simultaneously.

According to the standard of the Bluetooth Special Interest Group, different application layers correspond to different application profiles. That is, based on the connection in the GAP, it is required to reconnect in the application profile, such that a practical application function can be implemented.

Figure 2:
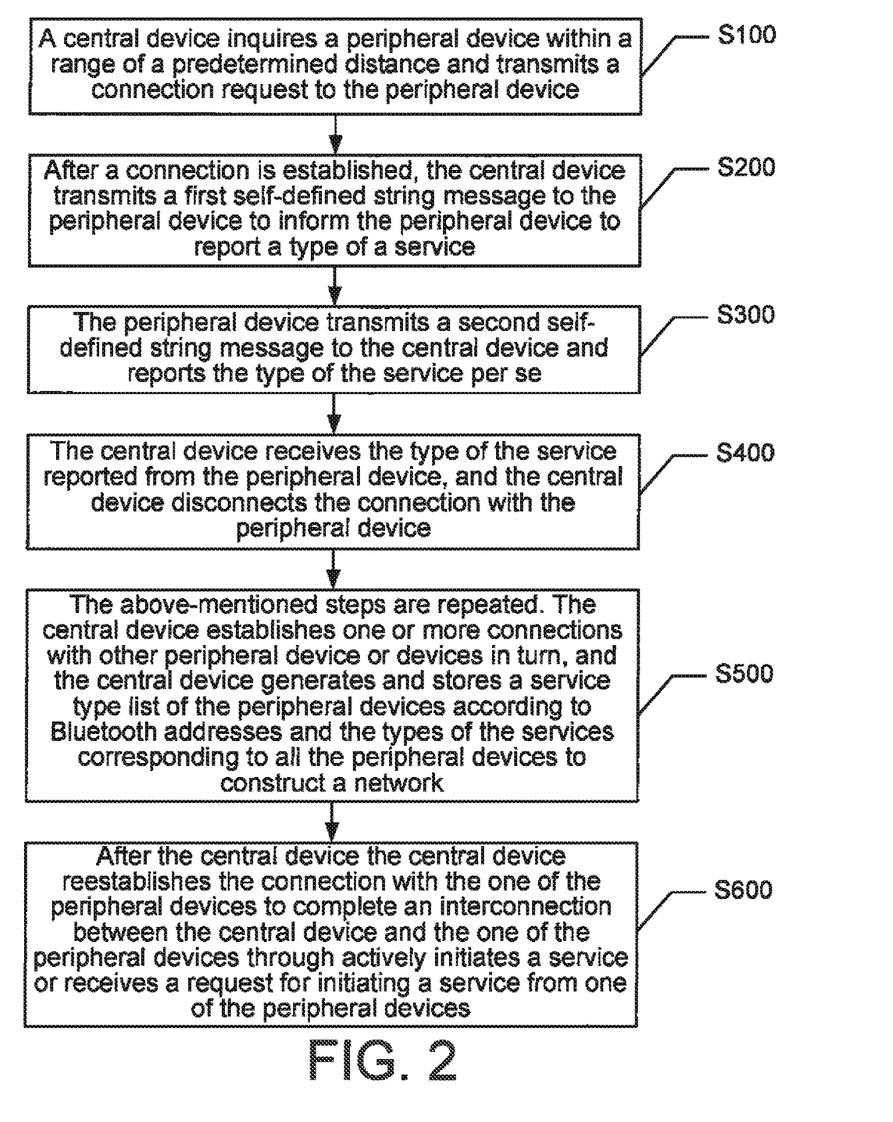
FIG. 2 is a flowchart of the multi-device intelligent interconnection method based on Bluetooth in accordance with a preferred embodiment of the present invention.

The present invention further provides a flowchart of a multi-device intelligent interconnection method based on Bluetooth. As shown in FIG. 2, the method comprises the following steps.

In step S100, a central device inquires a peripheral device within a range of a predetermined distance and transmits a connection request to the peripheral device. Specifically, the range of the predetermined distance refers to a range of a distance within which the central device can transmit Bluetooth data.

In step S200, after a connection is established, the central device transmits a first self-defined string message to the peripheral device to inform the peripheral device to report a type of a service.

In step S300, the peripheral device transmits a second self-defined string message to the central device and reports the type of the service per se.

In step S400, the central device receives the type of the service reported from the peripheral device, and the central device disconnects the connection with the peripheral device.

In step S500, the above-mentioned steps are repeated. The central device establishes one or more connections with other peripheral device or devices in turn, and the central device generates and stores a service type list of the peripheral devices according to Bluetooth addresses and the types of the services corresponding to all the peripheral devices to construct a network.

In step 600, after the central device the central device reestablishes the connection with the one of the peripheral devices to complete an interconnection between the central device and the one of the peripheral devices through actively initiates a service or receives a request for initiating a service from one of the peripheral devices.

Specifically, the first self-defined string message and the second self-defined string message respectively include a command length field, a destination channel identifier (ID) field, and a payload information field. Specifically, an embodiment of the first self-defined string message is shown in Table 9, and an embodiment of the second self-defined string message is shown in Table 11.

In one embodiment, step S600 specifically comprises the following steps.

In step S601, the central device actively initiates the service to inquire one or more adjacent peripheral devices.

In step S602, the one or more peripheral devices which support the type of the service are selected according to the stored service type list of the peripheral devices, and the one or more connections are established in turn to construct a piconet.

In step S603, the central device transmits self-defined broadcast information to the one or more peripheral devices in the piconet and broadcasts the type of the service to be initiated.

In step S604, after receiving the type of the service broadcasted from the central device, the one or more peripheral devices receive a user's command and transmit a self-defined response message to the central device.

In step S605, the central device gives a connection or disconnection feedback according to content of the response message from the one or more peripheral devices.

Step S600 further comprises the following steps.

In step S611, one or more of the peripheral devices send the request or requests for initiating the service or services and establish the connections with the central device.

In step S612, the one or more of the peripheral devices transmit self-defined service initiation messages to inform the central device of the types of the services to be initiated.

In step S613, after receiving the self-defined service initiation messages, the central device receives the user's command and accepts or refuses the service.

In the above-mentioned multi-device intelligent interconnection method based on Bluetooth, the central device is a mobile terminal with a Bluetooth function.

Figure 3:
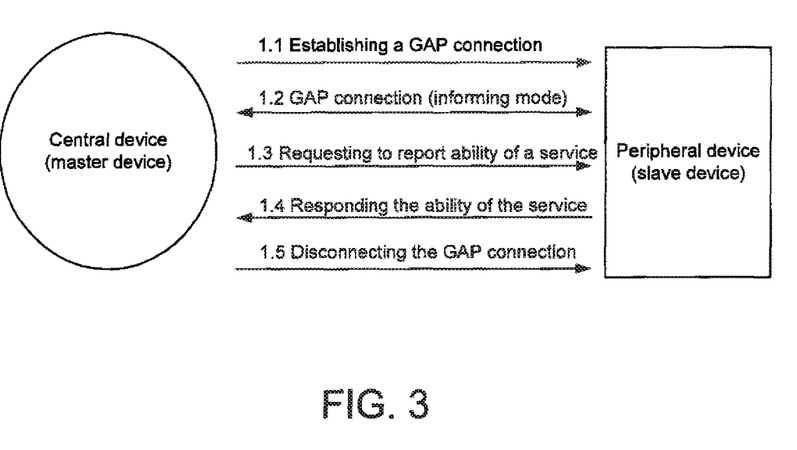
FIG. 3 is a flowchart of the multi-device intelligent interconnection method based on Bluetooth in accordance with a second preferred embodiment of the present invention.

Specifically, a process of constructing a network between a central device and a peripheral device is shown in FIG. 3. An objective of constructing the network is that the central device and the peripheral device identify with each other. Meanwhile, the peripheral device reports the ability of the service to the central device, and the central device generates a service ability list of the peripheral devices.

Firstly, after inquiring a first adjacent peripheral device, the central device transmits a connection request to the peripheral device to establish a GAP connection. The central device is a master device, and the peripheral device is a slave device. The central device and the peripheral device can transmit string messages with each other.

Then, the central device transmits a self-defined string message as shown in Table 9 to the peripheral device to inform the peripheral device to report ability of the service.

TABLE 9

| | | Information payload | |
|---|---|---|---|
| Length | Channel ID | Device Type | Command ID |
| 0x0002 2 Bytes | 2 Bytes | 11111111 1 Byte | 00000000 1 Byte |

Length represents a byte length of an information payload. Channel ID represents an ID of a destination channel which is dynamically designated by the system. Definitions of a device type and a command ID are shown in Table 10.

TABLE 10

| Parameter | Function | Value | Definition |
|---|---|---|---|
| Device Type | A device type of the transmitting device which is utilized for identify the transmitting device and the receiving device and distinguished from a common Bluetooth device | 11111111 00000000 | A central device A peripheral device |
| Command ID | A signaling type of a self-defined string message | 00000000 | The central device requests the peripheral device to report the ability of the service |
| | | 11111111 | The peripheral device reports the ability of the service |
| | | 11110000 | The device which actively initiates the service initiates the service request and transmits the type of the service to be initiated |
| | | 11110011 | The device which actively initiates the service ends the service |
| | | 00001111 | The device which receives the service initiation request transmits the response message |
| | | 00001100 | The device which accepts the service ends the service |

After receiving the message from the central device, the peripheral device transmits a self-defined string message as shown in Table 11 to the central device and reports the ability of the service to the central device.

TABLE 11

| | | Information payload | | | | |
|---|---|---|---|---|---|---|
| Length | Channel ID | Device Type | Command ID | Service 0 | Service 1 | ... Service 255 |
| 0 × 0102 2 Bytes | 2 Bytes | 00000000 1 Byte | 11111111 1 Byte | 1 Byte | 1 Byte | 1 Byte |

Length represents a byte length of an information payload. Channel ID represents an ID of a destination channel which is dynamically designated by the system. The definitions of the device type and the command ID are shown in Table 10. Service 0-Service 255 represent support situations of the type of the service. "11111111" represents a support situation, and "00000000" represents a non-support situation.

After acquiring the ability of the service of the peripheral device, the central device disconnects the GAP connection with the peripheral device.

In the same manner, the central device establishes the GAP connection or connections to other peripheral device or devices in turn to acquire the abilities of the services of the peripheral devices. The central device integrates the Bluetooth addresses and the types of the services of all the peripheral devices to generate a service ability list of the peripheral devices as shown in Table 12, so as to complete the network construction.

TABLE 12

| Peripheral device (Bluetooth address) | Type of the service | Support situation |
|---|---|---|
| 1 | 0: A voice call<br>1: An audio play<br>...<br>255: GNSS position | 11111111<br>00000000<br>...<br>111111111 |
| 2 | | |
| ... | | |
| N | | |

After the network construction is completed, the central device can inquire and connect with the peripheral devices, and the peripheral devices can connect with the central device as well. When the central device actively initiates a service or receives a request for initiating a service from one of the peripheral devices, the central device reestablishes the connection with the one of the peripheral devices to complete the corresponding service. The interconnection process can be divided into two application scenarios which will be described as follows.

Application Scenario 1

Figure 4:
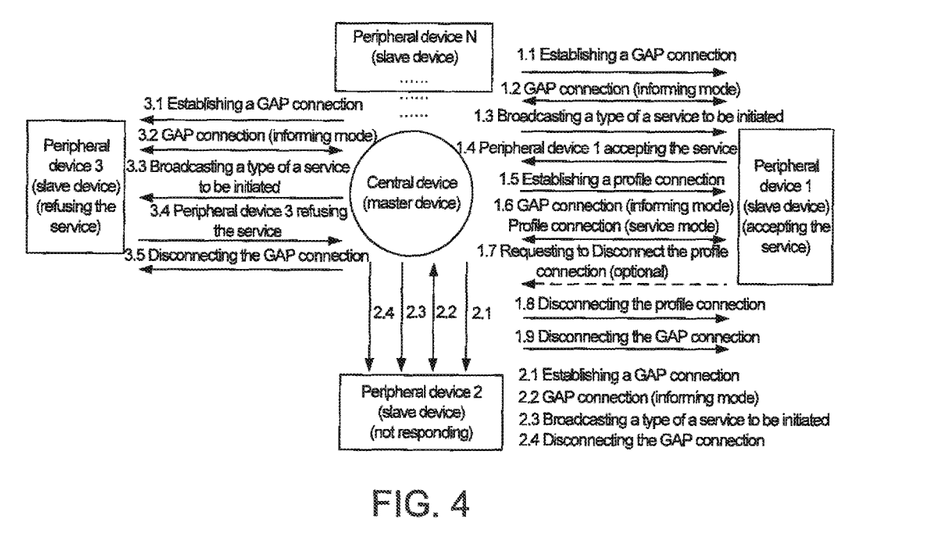
FIG. 4 is a flowchart of the multi-device intelligent interconnection method based on Bluetooth in accordance with a third preferred embodiment of the present invention.

The central device actively initiates the service, establishes the GAP connections with the peripheral devices which support the type of the service, and transmits the request for initiating the service. After receiving the message, one of the peripheral devices implements a profile interconnection with the central device to complete the corresponding service. The process of the interconnection is shown in FIG. 4.

When the central device generates the request for initiating the service, the central device inquires adjacent peripheral devices, selects one or more of the peripheral devices which support the type of the service according to the service ability list of the peripheral devices (Table 12), and establishes the GAP connection or connections with the one or more of the peripheral devices in turn. A piconet can be constructed by simultaneously seven peripheral devices. The central device is a master device, and the one or more of the peripheral devices are slave devices. Then, the central device transmits a self-defined string message as shown in FIG. 13 to the one or more of the peripheral devices and broadcasts the type of the service to be initiated.

TABLE 13

| | | | Information payload | | |
|---|---|---|---|---|---|
| Length | Channel ID | PSM | Device Type | Command ID | Service Type |
| m + 3<br>2 Bytes | 0x0002<br>2 Bytes | m (≥2) Bytes | 11111111<br>1 Byte | 11110000<br>1 Byte | 1 Byte |

Length represents a total byte length of PSM and an information payload. Channel ID is fixedly set as 0x0002. PSM represents multiplex of protocol/service and has a length of at least two bytes. The definitions of the device type and the command ID are shown in Table 10. Service type represents the type of the service to be initiated.

After receiving the type of the service broadcasted by the central device, the one or more of the peripheral devices in the piconet generate responses according to a user's selection and transmit self-defined string messages as shown in Table 14 to the central device.

TABLE 14

| | Channel | Information payload | | |
|---|---|---|---|---|
| Length | ID | Device Type | Command ID | Service Accept |
| 0x0003<br>2 Bytes | 2 Bytes | 00000000<br>1 Byte | 00001111<br>1 Byte | 1 Byte |

Length represents a byte length of an information payload. Channel ID represents an ID of a destination channel which is dynamically designated by the system. The definitions of the device type and the command ID are shown in Table 10. Service Accept represents whether to accept the service and has the following three definitions.

In the first definition, "00000000" represents that the present peripheral device rejects the service on behalf of all the peripheral devices. After receiving the message, the central device disconnects the GAP connections with all the peripheral devices and stops initiating the service.

In the second definition, "00001111" represents that the present peripheral device rejects the service. After receiving the message, the central device disconnects the GAP connection with the present peripheral device and waits for a response message from another one peripheral device. If no peripheral device accepts the service, the central device disconnects the GAP connections with all the peripheral devices and stops initiating the service.

In the third definition, "11111111" represents that the present peripheral device accepts the service. After receiving the message, the central device disconnects the GAP connection with the other peripheral device or devices. Meanwhile, the central device establishes a profile connection, which corresponds to the service, with the present peripheral device to complete the following service.

The central device gives feedback according to the above-mentioned response messages from the peripheral devices. When receiving a response message of Service Accept "11111111" from one of the peripheral devices, the central device disconnects the GAP connections with the other peripheral devices. Meanwhile, the central device establishes a profile connection corresponding to the service when the central device remains the GAP connection with the present peripheral device.

The central device monitors an end event of the service. When the service ends, the central device disconnects the profile connection and the GAP connection with the peripheral device. The interconnection process ends. The peripheral device can actively end the service and disconnect the profile connection. The peripheral device transmits a self-defined string message as shown in Table 15 to the central device. After receiving the message, the central device disconnects the profile connection and the GAP connection with the peripheral device in turn.

TABLE 15

| | Channel | Information payload | |
|---|---|---|---|
| Length | ID | Device Type | Command ID |
| 0x0002<br>2 Bytes | 2 Bytes | 00000000<br>1 Byte | 00001100<br>1 Byte |

Length represents a byte length of an information payload. Channel ID represents an ID of a destination channel which is dynamically designated by the system. The definitions of the device type and the command ID are shown in Table 10.

Application Scenario 2

Figure 5:
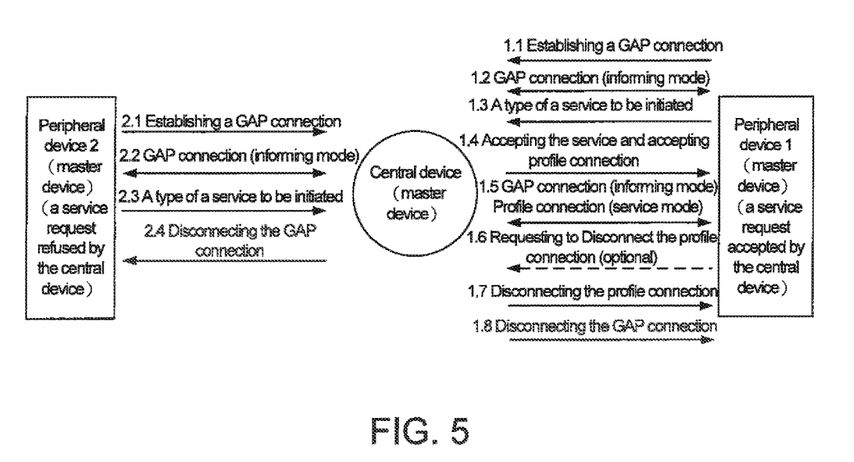
FIG. 5 is a flowchart of the multi-device intelligent interconnection method based on Bluetooth in accordance with a fifth preferred embodiment of the present invention.

The peripheral device actively initiates a service request and establishes a GAP connection and a profile connection with the central devices to complete the corresponding service. The process of the interconnection is shown in FIG. 5.

When the peripheral device generates the request for initiating the service, the peripheral device establishes the GAP connection with the central device firstly. The peripheral device is a master device, and the central device is a slave device. When plural peripheral devices generate the requests for initiating the services, the peripheral devices can respectively establish the GAP connections with the central device to construct a scatternet. Then, the peripheral devices transmit self-defined string messages as shown in Table 16 to the central device to inform the central device of the type of the service to be initiated.

TABLE 16

| Length | Channel ID | Information payload | | |
|---|---|---|---|---|
| | | Device Type | Command ID | Service Type |
| 0x0003 2 Bytes | 2 Bytes | 00000000 1 Byte | 11110000 1 Byte | 1 Byte |

Length represents a byte length of an information payload. Channel ID represents an ID of a destination channel which is dynamically designated by the system. The definitions of the device type and the command ID are shown in Table 10. Service Type represents the type of the service to be initiated.

After receiving the request for initiating the service, the central device disconnects the GAP connection with the peripheral device and stops initiating the service if the central device does not accept the service. The central device remains the GAP connection with the peripheral device and establishes a profile connection corresponding to the service if the central device accepts the service.

The central device monitors an end event of the service. When the service ends, the central device disconnects the profile connection and the GAP connection with the peripheral device in turn. The interconnection process ends. The peripheral device can actively end the service and disconnect the profile connection. The peripheral device transmits a self-defined string message as shown in Table 17 to the central device. After receiving the message, the central device disconnects the profile connection and the GAP connection with the peripheral device.

TABLE 17

| Length | Channel ID | Information payload | |
|---|---|---|---|
| | | Device Type | Command ID |
| 0x0002 2 Bytes | 2 Bytes | 00000000 1 Byte | 11110011 1 Byte |

Length represents a byte length of an information payload. Channel ID represents an ID of a destination channel which is dynamically designated by the system. The definitions of the device type and the command ID are shown in Table 10.

Based on the multi-device intelligent interconnection method based on Bluetooth in accordance with the above-mentioned embodiment of the present invention, the central device establishes the GAP connections with the peripheral devices in turn in the process of constructing a network. The identification is completed in the GAP connections via the self-defined string messages, and the peripheral devices report the abilities of the services. The central device generates a service ability list of the peripheral devices. After the network is constructed, the central device can inquire and connect with the peripheral devices. The peripheral devices can connect with the central device as well. When the central device generates a request for initiating a service or receives a request for initiating a service from one of the peripheral devices, the central device reestablishes the GAP connections with the peripheral devices. The signaling interaction is implemented in the GAP connections via the self-defined string messages. The operations including broadcasting, establishing, disconnection, rejection of the service to be initiated are completed, so as to implement the intelligent interconnection among the devices. The user can rapidly initiate the connection of the service based on Bluetooth between or among the smart devices, and thus the method provides the convenience for the user.

Figure 6:
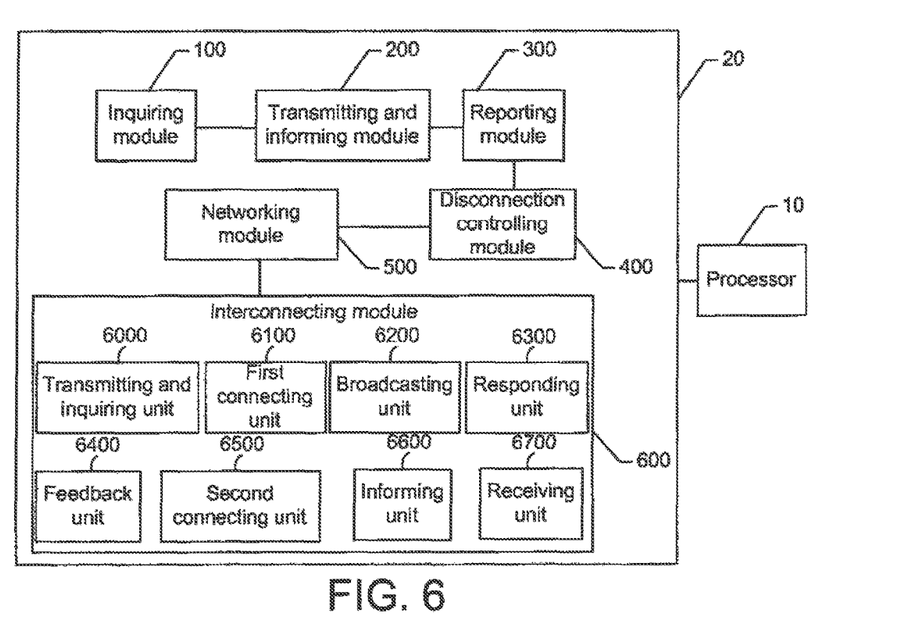
FIG. 6 is a functional block diagram of a multi-device intelligent interconnection system based on Bluetooth in accordance with a preferred embodiment of the present invention.

Based on the above-mentioned embodiment of the method, the present invention further provides a multi-device intelligent interconnection system based on Bluetooth. As shown in FIG. 6, the system comprises a processor 10 and a memory 20. The memory 11 is used for storing a plurality of program instructions. The processor 10 is connected with the memory 20, and is used to execute the program instructions stored inside the memory 20. All of the modules 100, 200, 300, 400, 500, and 600 and units 6000, 6100, 6200, 6300, 6400, 6500, 6600, and 6700 as introduced below, are program instructions executable by the processor 10 to perform corresponding functions. The system comprises:

An inquiring module 100 utilized to inquire an adjacent peripheral device and transmit a connection request to the peripheral device;

A transmitting and informing module 200 utilized to transmit a first self-defined string message to the peripheral device by the central device to inform the peripheral device to report a type of a service after a connection is established;

A reporting module 300 utilized to transmit a second self-defined string message to the central device and to report the type of the service by the peripheral device per se;

A disconnection controlling module 400 utilized to receive the reported type of the service from the peripheral device by the central device, and disconnect the connection with the peripheral device by the central device;

A networking module 500 utilized to establish one or more connections with other peripheral device or devices in turn, generate and store a service type list of the peripheral devices according to Bluetooth addresses corresponding to all the peripheral devices to construct a network, by the central device; and An interconnecting module 600 utilized to reestablish the connection with one of the peripheral devices to complete an interconnection between the central device and the one of the peripheral devices through actively initiating a service or receiving a request for initiating a service from the one of the peripheral devices.

In the multi-device intelligent interconnection system based on Bluetooth, the first self-defined string message and the second self-defined string message respectively include a command length field, a destination channel identification field, and a payload information field.

In the multi-device intelligent interconnection system based on Bluetooth, the interconnecting module 600 comprises:

A transmitting and inquiring unit 6000 utilized to actively initiate the service to inquire one or more of the peripheral devices by the central device;

A first connecting unit 6100 utilized to select one or more of the peripheral devices supporting the type of the service according to the stored service type list of the peripheral devices, and establish the connection or connections in turn to construct a piconet;

A broadcasting unit 6200 utilized to transmit self-defined broadcast information to the one or more of the peripheral devices in the piconet and broadcast the type of the service to be initiated by the central device;

A responding unit 6300 utilized to receive a user's command and transmitting one or more self-defined response messages to the central device, after the one or more of the peripheral devices in the piconet receive the type of the service broadcasted from the central device; and A feedback unit 6400 utilized to give a connection or disconnection feedback according to content of the one or more response messages from the one or more peripheral devices by the central device.

In the multi-device intelligent interconnection system based on Bluetooth, the interconnecting module 600 comprises:

A second connecting unit 6500 utilized to send the request or requests for initiating the service or services and to establish the connection or connections with the central device by one or more of the peripheral devices;

An informing unit 6600 utilized to transmit a self-defined service initiation message or messages to the central device to inform the central device of the type of the service to be initiated, by the one or more of the peripheral devices; and A receiving unit 6700 utilized to receive a user's command, and accept or refuse the service, after the central device receives the self-defined service initiation message or messages.

In the multi-device intelligent interconnection system based on Bluetooth, the central device is a mobile terminal with a Bluetooth function.

In summary, the present invention provides a multi-device intelligent interconnection method and system based on Bluetooth. The method comprises: inquiring a peripheral device within a range of a predetermined distance and transmitting a connection request to the peripheral device by a central device; transmitting a first self-defined string message to the peripheral device by the central device to inform the peripheral device to report a type of a service, after a connection is established; transmitting a second self-defined string message to the central device and reporting the type of the service by the peripheral device per se; receiving the reported type of the service from the peripheral device by the central device, and disconnecting the connection with the peripheral device by the central device; repeating the above-mentioned steps to establish one or more connections with other peripheral devices in turn, and generating and storing a service type list of the peripheral devices according to Bluetooth addresses and the types of the services corresponding to all the peripheral devices to construct a network, by the central device; and reestablishing the connection with one of the peripheral devices to complete an interconnection between the central device and the one of the peripheral devices through actively initiating a service or receives a request for initiating a service or services from the one of the peripheral devices. Based on the traditional Bluetooth, the present invention implements the intelligent interconnection between a smart mobile phone and an adjacent peripheral device with a Bluetooth function.

The user can rapidly initiate the connection of the service based on Bluetooth between or among the devices, and thus the present invention provides the convenience for the user.

As is understood by a person skilled in the art, the foregoing preferred embodiments of the present invention are illustrative rather than limiting of the present invention. It is intended that various modifications and similar arrangements are to be included within the spirit and scope of the appended claims, the scope of which should be accorded the broadest interpretation so as to encompass all such modifications and similar structures.

What is claimed is:

1. A multi-device intelligent interconnection method based on Bluetooth, comprising steps of:

inquiring a peripheral device within a range of a predetermined distance by a central device;

transmitting a connection request to the peripheral device by a central device;

transmitting a first self-defined string message to the peripheral device by the central device to inform the peripheral device to report a type of a service, after a connection between the central device and the peripheral device is established;

transmitting a second self-defined string message to the central device and reporting the type of the service by the peripheral device per se;

receiving the reported type of the service from the peripheral device by the central device;

disconnecting the connection with the peripheral device by the central device;

repeating the above-mentioned steps until the central device receives types of services from all peripheral devices within the range of the predetermined distance;

generating a service type list of the peripheral devices according to Bluetooth addresses and the types of the services corresponding to all the peripheral devices by the central device; and reestablishing the connection or connections with one or more of the peripheral devices to complete an interconnection or interconnections between the central device and the one or more of the peripheral devices based on the service type list of the peripheral devices through actively initiating one of the services by the central device.

2. The multi-device intelligent interconnection method based on Bluetooth of claim 1, wherein the step of reestablishing the connection or connections with the one or more of the peripheral devices to complete the interconnection or interconnections between the central device and the one or more of the peripheral devices based on the service type list of the peripheral devices through actively initiating one of the services by the central device specifically comprises:

actively initiating the service to inquire an adjacent one or more of the peripheral devices by the central device;

selecting one or more of the peripheral devices which support the type of the service according to the stored service type list of the peripheral devices by the central device; and establishing the connection or connections in turn to construct a piconet by the central device.

3. The multi-device intelligent interconnection method based on Bluetooth of claim 2, after the step of establishing the connection or connections in turn to construct the piconet by the central device, the method further comprising:

transmitting self-defined broadcast information to the one or more of the peripheral devices in the piconet and broadcasting the type of the service to be initiated by the central device;

receiving a user's command by the one or more of the peripheral devices;

transmitting one or more self-defined response messages to the central device according to the user's command, after the one or more of the peripheral devices in the piconet receives the type of the service broadcasted from the central device; and giving a connection or disconnection feedback according to content of the response message or messages from the one or more of the peripheral devices by the central device.

4. The multi-device intelligent interconnection method based on Bluetooth of claim 1, after the step of generating the service type list of the peripheral devices according to Bluetooth addresses and the types of the services corresponding to all the peripheral devices by the central device, the method further comprising:

storing the service type list of the peripheral devices by the central device.

5. The multi-device intelligent interconnection method based on Bluetooth of claim 1, wherein the first self-defined string message includes a command length field, a destination channel identification field, and a payload information field.

6. The multi-device intelligent interconnection method based on Bluetooth of claim 1, wherein the second self-defined string message includes a command length field, a destination channel identification field, and a payload information field.

7. The multi-device intelligent interconnection method based on Bluetooth of claim 1, wherein the central device is a mobile terminal with a Bluetooth function.

8. A multi-device intelligent interconnection method based on Bluetooth, comprising steps of:

inquiring a peripheral device within a range of a predetermined distance by a central device;

transmitting a connection request to the peripheral device by a central device;

transmitting a first self-defined string message to the peripheral device by the central device to inform the peripheral device to report a type of a service, after a connection between the central device and the peripheral device is established;

transmitting a second self-defined string message to the central device and reporting the type of the service by the peripheral device per se;

receiving the reported type of the service from the peripheral device by the central device;

disconnecting the connection with the peripheral device by the central device;

repeating the above-mentioned steps until the central device receives the types of the services from all peripheral devices within the range of the predetermined distance; and reestablishing the connection or connections with one or more of the peripheral devices to complete an interconnection or interconnections between the central device and the one or more of the peripheral devices through receiving a request or requests for initiating one or more of the services from the one or more of the peripheral devices by the central device.

9. The multi-device intelligent interconnection method based on Bluetooth of claim 8, wherein the step of reestablishing the connection or connections with the one or more of the peripheral devices to complete the interconnection or interconnections between the central device and the one or more of the peripheral devices through receiving the request or requests for initiating the one or more of the services from the one or more of the peripheral devices by the central device specifically comprises:

sending the request or requests for initiating the one or more of the services from the one or more of the peripheral devices; and establishing the connection or connections with the central device by the one or more of the peripheral devices.

10. The multi-device intelligent interconnection method based on Bluetooth of claim 9, after the step of establishing the connection or connections with the central device by the one or more of the peripheral devices, the method further comprising:

transmitting one or more self-defined service initiation messages to the central device to inform the central device of the type of the service or the types of the services to be initiated, by the one or more of the peripheral devices; and receiving a user's command, and accepting or refusing the service or the services, after the central device receives the self-defined service initiation message or messages.

11. The multi-device intelligent interconnection method based on Bluetooth of claim 8, after the step of repeating the above-mentioned steps until the central device receives types of services from all peripheral devices within the range of the predetermined distance, the method further comprising:

generating a service type list of the peripheral devices according to Bluetooth addresses and the types of the services corresponding to all the peripheral devices by the central device; and storing the service type list of the peripheral devices by the central device.

12. The multi-device intelligent interconnection method based on Bluetooth of claim 8, wherein the first self-defined string message includes a command length field, a destination channel identification field, and a payload information field.

13. The multi-device intelligent interconnection method based on Bluetooth of claim 8, wherein the second self-defined string message includes a command length field, a destination channel identification field, and a payload information field.

14. The multi-device intelligent interconnection method based on Bluetooth of claim 8, wherein the central device is a mobile terminal with a Bluetooth function.

15. A multi-device intelligent interconnection system based on Bluetooth, comprising:

a processor;

a memory connected with the processor, the memory comprising a plurality of program instructions executable by the processor, the plurality of program instructions comprising:

an inquiring module configured to cause the processor to inquire a peripheral device within a range of a predetermined distance and transmit a connection request to the peripheral device by a central device;

a transmitting and informing module configured to cause the processor to transmit a first self-defined string message to the peripheral device by the central device to inform the peripheral device to report a type of a service, after a connection is established;

a reporting module configured to cause the processor to transmit a second self-defined string message to the central device and report the type of the service by the peripheral device per se;

a disconnection controlling module configured to cause the processor to receive the reported service type from the peripheral device by the central device, and disconnect the connection with the peripheral device by the central device;

a networking module configured to cause the processor to establish one or more connections with other peripheral device or devices in turn, generate and store a service type list of the peripheral devices according to Bluetooth addresses and the types of the services corresponding to all the peripheral devices by the central device, by the central device; and an interconnecting module configured to cause the processor to reestablish the connection or connections with one or more of the peripheral devices to complete an interconnection or interconnections between the central device and the one or more of the peripheral devices through actively initiating one of the services or receiving a request or requests for initiating one or more of the services from the one or more of the peripheral devices, by the central device.

16. The multi-device intelligent interconnection system of claim 15, wherein the first self-defined string message includes a command length field, a destination channel identification field, and a payload information field.

17. The multi-device intelligent interconnection system of claim 15, wherein the second self-defined string message includes a command length field, a destination channel identification field, and a payload information field.

18. The multi-device intelligent interconnection system of claim 15, wherein the interconnecting module comprises:

a transmitting and inquiring unit configured to cause the processor to actively initiate the service to inquire adjacent one or more of the peripheral devices by the central device;

a connecting unit configured to cause the processor to select one or more of the peripheral devices which support the type of the service according to the stored service type list of the peripheral devices, and establish the connection or connections in turn to construct a piconet by the central device;

a broadcasting unit configured to cause the processor to transmit self-defined broadcast information to the one or more of the peripheral devices in the piconet and broadcast the type of the service to be initiated by the central device;

a responding unit configured to cause the processor to receive a user's command and transmit one or more self-defined response messages to the central device, after the one or more of the peripheral devices in the piconet receive the type of the service broadcasted from the central device; and a feedback unit configured to cause the processor to give a connection or disconnection feedback according to content of the response message or messages from the one or more peripheral devices by the central device.

19. The multi-device intelligent interconnection system of claim 15, wherein the interconnecting module comprises:

a second connecting unit configured to cause the processor to send the request or requests for initiating the one or more of the services, and establish the connection or connections with the central device by the one or more of the peripheral devices;

an informing unit configured to cause the processor to transmit one or more self-defined service initiation messages to the central device to inform the central device of the type of the service or the types of the services to be initiated, by the one or more of the peripheral devices; and a receiving unit configured to cause the processor to receive a user's command, and accept or refuse the service or the services, after the central device receives the self-defined service initiation message or messages.

20. The multi-device intelligent interconnection system of claim 15, wherein the central device is a mobile terminal with a Bluetooth function.

* * * * *